Patented July 1, 1952

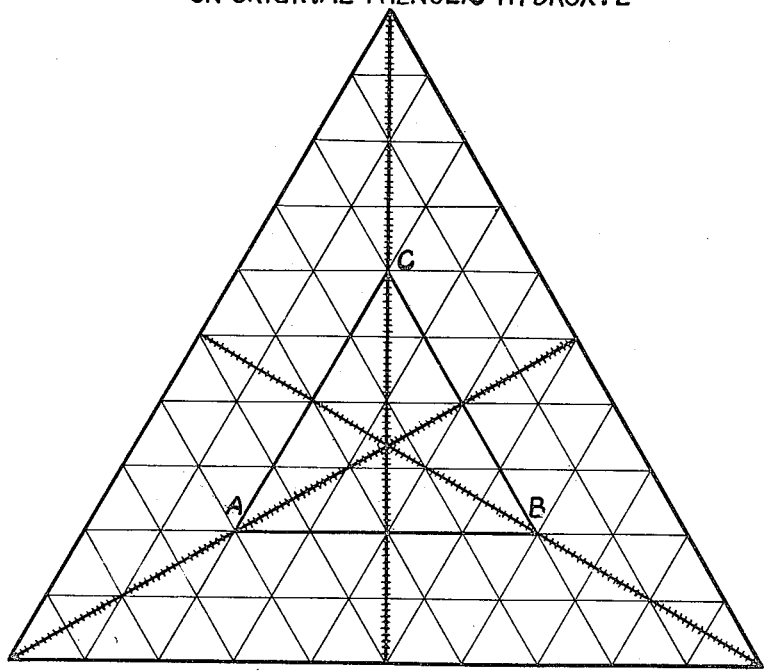

2,602,053

UNITED STATES PATENT OFFICE 2,602,053

PROCESS FOR BREAKING PETROLEUM EMULSIONS

Melvin De Groote, University City, Mo., assignor to Petrolite Corporation, Ltd., Wilmington, Del., a corporation of Delaware Application August 14, 1950, Serial No. 179,402

7 Claims. (Cl. 252—331)

This invention relates to processes or procedures particularly adapted for preventing, breaking, or resolving emulsions of the water-in-oil type and particularly petroleum emulsions.

My invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

Reference is made to U. S. Patent No. 2,499,368. This patent is concerned with a process for breaking petroleum emulsions of the water-in-oil type, characterized by subjecting the emulsion to the action of a demulsifier including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

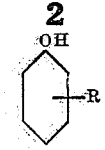

in which R is a hydrocarbon radical having not more than 24 carbon atoms and substituted in the 2, 4, 6 position; said oxyalkylated resin being characterized by the introduction into the resin molecule of a plurality of divalent radicals having the formula $(R_1O)n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

I have found that if a phenol-aldehyde resin is prepared from a difunctional hydrocarbon-substituted phenol having at least 4 and not over 18 carbon atoms in the substituent radical, and if such phenol-aldehyde resin is treated with ethylene oxide so as to obtain three different degrees of oxyethylation as hereinafter described, that a mixture of these three has a synergistic property as far as demulsification is concerned, insofar that such mixture is more effective, for instance, at least 10% more effective than any one of the three components alone or any two of the three in combination. This applies provided the mixture of the three is within certain proportions, i. e., at least 20% and not more than 60% of each of the three components. Reference is made to the chart of the hereto attached drawing.

Specifically, then, the present invention is concerned with a process for breaking petroleum emulsions of the water-in-oil type characterized by subjecting the emulsion to the action of a demulsifier which in turn is a synergistic ternary mixture of three components, each of the three components being a hydrophile synthetic product; said hydrophile synthetic product being the oxyethylation product of (A) ethylene oxide, and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

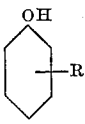

in which R is a hydrocarbon radical having at least 4 and not more than 18 carbon atoms and substituted in the 2, 4, 6 position; said oxyethylated resin being characterized by the introduction into the resin molecule of a plurality of divalent radicals having the formula $(C_2H_4O)_n$; in one of the three components $n$ varies from 2.0 to 2.4 on a molal basis calculated on the original phenolic hydroxyl; in the second component $n$ varies from 3.0 to 3.6 on a molal basis calculated on the original phenolic hydroxyl; in the third component $n$ varies from 4 to 4.8 on a molal basis calculated on the original phenolic hydroxyl; the phenolic and aldehydic reactants being identical in all three components; the combining ratios of the three components being determined by the triangular area of the graph in the hereto appended drawing as defined approximately by the triangle A, B, C, said proportions being on a weight basis; and with the final proviso that said demulsifier be more effective than (1) any of the three components alone, or (2) any two of the three components in combination.

For convenience, the subsequent subject matter will be divided into four parts:

Part 1 is concerned with the preparation of the phenol-aldehyde resin;

Part 2 is concerned with the oxyethylation of the resin;

Part 3 is concerned with the preparation of the mixtures to yield a combination having the synergistic property previously referred to, and Part 4 is concerned with this mixture for use in demulsification.

PART 1

This part is concerned with the preparation of phenol-aldehyde resins of the kind described in detail in U. S. Patent No. 2,499,370, dated March 7, 1950, to De Groote and Keiser, with the following qualifications: said aforementioned patent is limited to resins obtained from difunctional phenols having 4 to 12 carbon atoms in the substituent hydrocarbon radical. For the present purpose the substituent may have as many as 18 carbon atoms, as in the case of resins prepared from tetradecylphenol, substantially para-tetradecylphenol, commercially available. Similarly, resins can be prepared from hexadecylphenol or octadecylphenol. This feature will be referred to subsequently.

In addition to U. S. Patent No. 2,499,370, reference is made also to the following U. S. patents: Nos. 2,499,365, 2,499,366, and 2,499,367, all dated March 7, 1950, to De Groote and Keiser. These patents, along with the other two previously mentioned patents, describe phenolic resins of the kind herein employed as initial materials.

For practical purposes, the resins having 4 to 12 carbon atoms are most satisfactory, with the additional $C_{14}$ carbon atom also being very satisfactory. The increased cost of the $C_{16}$ and $C_{18}$ carbon atom phenol renders these raw materials of less importance, at least at the present time.

Patent 2,499,370 describes in detail methods of preparing resins useful as intermediates for preparing the products of the present application, and reference is made to that patent for such detailed description and to Examples 1a through 103a of that patent for examples of suitable resins.

As previously noted, the hydrocarbon substituent in the phenol may have as many as 18 carbon atoms, as illustrated by tetradecylphenol, hexadecylphenol and octadecylphenol, reference in each instance being to the difunctional phenol, such as the ortho- or para-substituted phenol, or a mixture of the same. Such resins are described also in issued patents, for instance, U. S. Patent No. 2,499,365, dated March 7, 1950, to De Groote and Keiser, such as Example 71a.

PART 2

As has been pointed out previously suitable resins can be made following the procedures described or, for that matter, can be purchased in the open market. The second step in the overall procedure involves the use of ethylene oxide.

I have prepared a large number of resins of the kind described in Part 1, preceding, on a laboratory scale varying from a few hundred grams or less to somewhat larger amounts. Needless to say, they are prepared also regularly on an industrial scale. This same statement applies to the preparation of the oxyethylated products with which this second part is concerned.

For a number of well known reasons equipment, whether laboratory size, semi-pilot plant size, pilot plant size, or large scale size, is not as a rule designed for a particular alkylene oxide. Invariably and inevitably, however, and particularly in the case of laboratory equipment the design is such as to use any of the customarily available alkylene oxides, i. e., ethylene oxide, propylene oxide, butylene oxide, glycide, epichlorohydrin, styrene oxide, etc.

Oxyethylations, and for that matter oxypropylations, are conducted under a wide variety of conditions not only in regard to presence or absence of catalyst, kind of catalyst subsequently described, but also in regard to time of reaction, temperature of reaction, speed of reaction, pressure during reaction, etc. Oxyalkylations, and particularly oxyethylations, can be conducted at temperatures approximating the boiling point of water or slightly above, as for example 105° to 115° C.

Likewise, resins can be oxyalkylated, particularly with ethylene oxide, using temperatures and pressures which are comparatively high, for instance, temperatures in the neighborhood of 200° C., or in excess thereof, and pressures in the neighborhood of 200 pounds per square inch, or in excess thereof. Such oxyalkylations have been described in aforementioned U. S. Patent No. 2,499,370. Generally speaking, such procedure is employed under conditions where there are more than three points of reaction per molecule, and where the amount of oxide added is comparatively high in ratio to the initial reactant. Such procedure is entirely satisfactory in the particular oxyalkylation step described in the instant part, i. e., Part 2.

However, since the amount of oxide is comparatively low, from approximately 2 moles per phenolic hydroxyl up to approximately 4 moles or slightly in excess thereof, it is apparent that time is not a factor. In other words, it is just as satisfactory to employ a comparatively low temperature and low pressure rather than conditions of oxyalkylation previously mentioned, which result in a rapid reaction rate. For this reason I have employed conditions of the kind involving temperatures of about 95° to 115° C., and pressures of 30 to 40 pounds, or less. If an atmosphere of inert gas, such as nitrogen, is present during a reaction needless to say the pressures may be somewhat higher.

Such low temperature, low reaction rate oxyalkylations have been described very completely in U. S. Patent No. 2,448,664, to Fife et al., dated September 7, 1948.

As previously indicated, low pressure, low temperature reaction rates may require considerable time, as, for instance, in some of the subsequent examples in the neighborhood of one to two hours. Actually, at 180° to 200° C., such reaction might be conducted in ten minutes or less. In large scale low temperature operations the time might be somewhat longer, for instance, 5 to 8 hours. In any event, the reaction is so comparatively short, that it is of no marked significance, but it is more convenient to use these lower temperatures on a laboratory or semi-pilot plant scale.

I have used conventional equipment with two added automatic features: (a) A solenoid-controlled valve which shuts off the ethylene oxide in event that the temperature gets outside a predetermined and set range, for instance, 110° to 120° C., and (b) another solenoid valve which shuts off the ethylene oxide (or for that matter propylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. For reasons which are obvious in light of what has been said previously, I have not found it necessary to use such automatic controls under the conditions of oxyethylation employed in introducing such small portion of alkylene oxide. Controls could be used, if desired, and certainly would be used in high temperature oxyalkylations.

Thus, in preparing the various examples I have found it particularly advantageous to use laboratory equipment which is designed to permit continuous oxyalkylation, whether it be oxypropylation or oxyethylation.

The oxyethylation procedure employed in the preparation of the oxyethylation derivative has been uniformly the same, particularly in light of the fact that either a continuous automatically-controlled procedure was employed, or else a short non-automatic method is used. Indeed, in this instance, the latter is preferred. In this procedure the autoclave was a conventional autoclave made of stainless steel and having a capacity of approximately one gallon and a working pressure of one thousand pounds gauge pressure. This pressure obviously is far beyond any requirement, as far as ethylene or propylene oxide goes, unless there is a reaction of explosive violence involved, due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge, manual vent line; charge hole for initial reactants; at least one connection for introducing the alkylene oxide, such as propylene oxide or ethylene oxide, to the bottom of the autoclave, along with suitable devices for both cooling and heating the autoclave, such as a cooling jacket, and preferably, coils in addition thereto, with the jackets so arranged that it is suitable for heating with steam or cooling with water and further equipped with electrical heating devices. Such autoclaves are, of course, in essence small-scale replicas of the usual conventional autoclave used in oxyalkylation procedures. In some instances, a larger autoclave was used, i. e., one having a capacity ranging in the neighborhood of 1¾ gallons.

Continuous operation, or substantially continuous operation, was achieved by the use of a separate container to hold the alkylene oxide being employed, particularly ethylene oxide or propylene oxide. The container consists essentially of a laboratory bomb having a capacity of about one-half gallon, or somewhat in excess thereof. In some instances, a larger bomb was used, to wit, one having a capacity of about one gallon. This bomb was equipped, also, with an inlet for charging and an eductor tube going to the bottom of the container so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use. The connections between the bomb and the autoclave were flexible stainless steel hose, or tubing, so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

In using small amounts of ethylene oxide involved in the low ratio components, i. e., approximately 2 moles of ethylene oxide per phenolic hydroxyl one need not employ the automatic devices unless desired. Autoclaves of the kind described are equipped with automatic controls, which would shut off the ethylene oxide or propylene oxide in event temperature of reaction passes out of the predetermined range, or pressure in the autoclave passes out of the predetermined range. However, in procedure of the kind herein reported, I have done nothing further than to set the inlet open so the oxide was added in approximately three hours and then proceed to let the autoclave run for a total of four hours, to insure completeness of reaction. Pressures in no instance registered more than 30 to 40 pounds and the temperatures varied from 95° to 115° C.

One thing must be borne in mind when operating at these comparatively low temperatures of oxyalkylation. When operating at a comparatively high temperature, for instance, between 150° to 200° C., an unreacted alkylene oxide, such as ethylene or propylene oxide, makes its presence felt in the increase in pressure or the consistency of a high pressure. However, at a low enough temperature, it may happen that the oxide, such as propylene oxide, goes in as a liquid. If so, and if it remains unreacted, there is, of course, an inherent danger and appropriate steps must be taken to safeguard against this possibility; if need be, a sample must be withdrawn and examined for unreacted propylene oxide, or ethylene oxide. One obvious procedure, of course, is to oxypropylate or oxyethylate at a modestly higher temperature, for instance, 140° to 150° C.

Obviously, similar precautions are necessary in the case of ethylene oxide, although it is more reactive than propylene oxide.

The amount of catalyst used in oxyalkylation may vary from as little as ½% up to 5%. The amount may vary during the oxyalkylation period, as exemplified by the addition of the catalyst at the very beginning of the reaction only and with no further addition. Needless to say, there is a comparatively high concentration of catalyst at the beginning of the reaction and a comparatively low concentration at the end; in fact, not infrequently the amount of catalyst at the end will be one-half of 1% sodium methylate, or caustic soda, or less. Catalyst can be added intermittently during the reaction period, provided suitable equipment is available. It is rather difficult to employ such equipment on a laboratory scale, but it can be employed, of course, on a pilot plant scale or larger scale.

In the present situation, since comparatively little of the ethylene oxide was added per phenolic hydroxyl (about 2 to 4 moles per hydroxyl), time of reaction is not apt to be a factor. In other comparable oxyalkylations, as have been described in the literature, the amount of oxide added might be 50 to 100 times this amount. Under such circumstances, it is necessary to speed up the reaction in order to finish the process within a reasonable length of time. In the present case the amount of oxide added was so small that even using a low temperature (95° to 115° C.), and a comparatively low pressure, less than 30 or 40 pounds maximum, the reaction was complete in a very short period of time. As a convenience, I have generally added the oxide over a 3-hour to 8-hour period, since the apparatus was practically automatic. The amount of catalyst use was generally about 1.0% to 3.0% of the initial resin. Somewhat more can be used, or slightly less. If more is used the reaction would, of course, be faster, and if less is used reaction might be a little slower.

One limitation of small-scale autoclave equipment (a gallon to a 2-gallon autoclave) is the difficulty involved in a suitable automatic device for adding a dry catalyst, such as sodium methylate, during the reaction. This presents no problem on a large scale with larger size equipment, and thus, the same operation conducted in equipment of increased capacity means that all the catalyst need not be added at once, but can be added intermittently in a predetermined amount, based on an hourly rate, or based on the addition of ethylene or propylene oxide. For instance, in a large scale operation involving equipment having about twenty-five times the capacity of the autoclave employed, arrangements were made to introduce better than a gallon of ethylene or propylene oxide (4,000 grams) per hour, along with the introduction of 20 grams of sodium methylate hourly during the operation period. The net result, as far as the final material was concerned, was the same, to wit, a residual alkaline catalyst equivalent to about ½% sodium methylate.

In the following example sodium methylate is used as a catalyst. The resin used was prepared in the manner described by reference to the "a" examples in Patent 2,499,370 using 3 moles of the phenol as a starting material. In each instance the amount of xylene employed was 300 grams. In all other respects, amount of aldehyde, etc., the procedure was the same, the weight ratios only being different. In the succeeding tables the amount of xylene resin solution is shown by weight; subtracting 300 in each instance gives the weight of the resin. For purpose of calculation the alkylene oxide added and the original phenol employed in manufacture was used as a basis. This was more convenient than using the weight of resin obtained, because it may vary somewhat from batch to batch. One reason for using the original phenol as a base for calculation is that the claims and the hereto appended drawing, which in essence is part of the claims also, specifies the components in terms of the ethylene oxide to phenolic hydroxyl ratio. Actually, the amount was weighed on a laboratory balance which may have been inaccurate to the extent of ¼% to ½%. This, of course, is immaterial in a procedure of the present type. Similarly, the ethylene oxide was weighed as closely as possible, but here again the variation could have been ½% to 1%. 3-gram moles of the phenol were used to provide the resin. The amount of oxide employed is shown in the table. The amount of catalyst (sodium methylate) employed is also shown. In all instances the temperature, as stated, was never higher than 115° C. and generally varied from 100° C. to 110° C. The pressure was never higher than 40 pounds per square inch, and in all instances the reaction was complete in 3 to 8 hours.

Oxyethylation was conducted in the usual manner, first sweeping out the equipment with nitrogen and setting the controls as far as the addition of the oxide was concerned but ignoring the controls as far as temperature and pressure were concerned. Any adjustment required in the matter of temperature and pressure could be made manually by examination of the gauges a few times during the entire procedure. The next step was to add the ethylene oxide in such a manner that it was injected in the reaction vessel in somewhere between 2 to 2½ hours and then permitting the reaction period to extend up to 3 hours so as to be sure all the oxide had combined. All the oxide had combined in this intance using a minimum amount of oxide. However, when the maximum amount of oxide was used the time period was more apt to be 5 to 6½ hours if the final stirring period extended to 6 to 8 hours.

Specific examples are included by way of illustration, as follows:

*Example 1b*

486 grams of a resin of the kind described as Example 1a, of Patent 2,499,370, mixed with 300 grams of xylene were used as the initial charge. To this there were added 1.25% (about 6.5 grams) of sodium methylate. These ingredients were placed in the autoclave and the autoclave sealed and the automatic devices adjusted for injecting 291 grams of ethylene oxide in about 2½ hours. The reaction was continued for about 3¼ hours to be sure that it was complete. The ratio is 2.2 moles of ethylene oxide for each initial phenolic hydroxyl involved in resin manufacture. The temperature was approximately 110° C. and the pressure was less than 30 pounds per square inch. The final product was a viscous semi-resinous product being somewhat between a resin and a viscous amber-colored fluid obtained by increased oxyethylation. In such instances where the resins employed were liquids, needless to say, further oxyalkylation was in the direction of reduced viscosity. Some resins which were pratically viscous liquids to start with became less viscous or more towards the liquid stage. The color varied from deep red or amber to some darker shades and in some instances to lighter shades. The residual product was, of course, slightly alkaline.

Example 2b

The same procedure was repeated, using the same amount of resin, a somewhat larger amount of catalyst (9 grams), and 436 grams of oxide. This oxide was injected in a 5-hour period and then stirring continued for an hour longer. Otherwise the operating conditions were the same as in Example 1b, preceding. This oxide ratio represented 3.3 moles per phenolic hydroxyl.

Example 3b

The same procedure was followed as in Example 1b except that the amount of catalyst was larger, i. e., 12 grams. The amount of oxide injected was 582 grams, equivalent to 4.4 moles per phenolic hydroxyl.

Example 4b

The same procedure was followed as in Example 1b, preceding, except that 528 grams of the resin identified as Example 3a, of Patent 2,499,370, were used instead of 486 grams of resin Example 1a in Example 1b. Similarly, the amount of xylene was the same, i. e., 300 grams. The amount of ethylene oxide was the same as in Example 1b. The conditions of oxyethylation were the same as in Example 1b. The ratio of oxide to resin was the same as in Example 1b, i. e., 2.2 moles per phenolic hydroxyl. The appearance of the final product was substantially the same as in Example 1b.

Example 5b

The same procedure was followed as in Example 2b, preceding, using resin of Example 3a of Patent 2,499,370. 528 grams of resin mixed with 300 grams of xylene were employed. 9 grams of catalyst were employed. 436 grams of ethylene oxide were injected. The time period was the same as in Example 2b, preceding. The ratio of oxide to resin was the same as in Example 2b, to wit, 3.3 moles per phenolic hydroxyl.

Example 6b

The same procedure was followed as in Example 3b, preceding, except that the resin employed was 528 grams of resin of Example 3a of Patent 2,499,370. The amount of xylene employed was 300 grams. The amount of catalyst employed was 12.5 grams. Conditions of oxyethylation were substantially the same as in Example 3b, preceding. The final product had about the same appearance as in the case of Example 3b, preceding. The amount of oxide used was 582 grams. This represented a ratio of 4.4 moles per phenolic hydroxyl.

Example 7b

The same procedure was followed as in Example 1b, preceding, except that the resin employed was the one identified as Example 73a of Patent 2,499,370. The amount employed was 822 grams. This was mixed with 300 grams of xylene. The amount of catalyst employed was 8 grams. The conditions of reaction were substantially the same as in Example 1a, of Patent 2,499,370. The amount of oxide was 291 grams. This represented a ratio of 2.2 moles per phenolic hydroxyl.

Example 8b

The same procedure was followed as in Example 2b, preceding, except that 822 grams of resin 73a of Patent 2,499,370 were employed instead of resin of Example 1a of Patent 2,499,370. The amount of oxide added was 436 grams. The amount of catalyst employed was somewhat larger, 13 grams. The conditions of reaction in all other respects were identical with that described in Example 2b. The appearance of the final product was much the same. The amount of oxide represented 3.3 moles per phenolic hydroxyl.

Example 9b

The same procedure was followed as in Example 3b, preceding, except that 822 grams of resin of Example 73a of Patent 2,499,370 were used instead of resin of Example 1a of Patent 2,499,370. The amount of catalyst was somewhat larger, 16 grams. The amount of oxide added was 582 grams. The time of reaction and conditions of reaction were substantially the same as described in Example 3b, preceding. The appearance of the final product was much the same as in Example 3b, preceding. The amount of oxide employed represented 4.4 moles per phenolic hydroxyl.

The above examples illustrate definite ratio oxyethylation and the procedure is identical with that which has been described repeatedly in various patents. Needless to say, the oxyethylations could be conducted at a higher temperature in less time just as satisfactorily. This is purely a matter of choice and a matter of equipment available.

PART 3

If desired the solutions of the oxyethylated resins described in Part 2, preceding, can be freed from solvent by the usual procedure, i. e., distillation and particularly vacuum distillation. However, as far as use as demulsifiers is concerned I have found it more convenient simply to dilute the xylene solution to 50% by weight and then mix the xylene solutions to obtain the synergistic mixtures herein specified.

Reference is now made to the triangular graph of the hereto attached drawing. This is a conventional graph where each apex represents 100% of the particular oxyethylated resin as indicated. I have found that if mixtures are made of the three oxyethylated resins derived, of course, from the same resin, and if such mixtures fall within the triangle A, B, C, then and in that event such mixtures in many instances are at least 10% better than the comparable three ingredients alone, or any mixture of two of the three ingredients. In other words there is a synergistic effect involved, the exact nature of which is open to speculation. Obviously the preparation of such mixtures requires no description beyond the chart itself. Each of the three determining points represents 60% of one component and 20% each of the other two. A mixture of one-third each, of course, is right in the center of the defined area A, B, C. I have made samples of such mixtures by mixing the first three oxyethylated resins, i. e., 1b, 2b, and 3b. Similarly, I have mixed the next three, i. e., 4b, 5b, and 6b; and also I have mixed the last series, 7b, 8b, and 9b. In each case a variety of mixtures are obtained, all of which fall within the composition of the specified area A, B, C.

Such mixtures are illustrated by the following examples:

| Ex. No. | Prepared From | Percentage of 2.2 oxyethylation | | | | | | | Percentage of 3.3 oxyethylation | | | | | | | Percentage of 4.4 oxyethylation | | | | | | |
|---|---|---|---|---|---|---|---|---|---|---|---|---|---|---|---|---|---|---|---|---|---|---|
| | | 20 | 30 | 33.3 | 35 | 40 | 50 | 60 | 20 | 30 | 33.3 | 35 | 40 | 50 | 60 | 20 | 30 | 33.3 | 35 | 40 | 50 | 60 |
| 1c | 1b, 2b, and 3b | | | | | | | | | | | | X | | | | | | | X | | |
| 2c | do | | X | | | | | | | X | | | | | | | | | | X | | |
| 3c | do | | | X | | | | | | | X | | | | | | X | | X | | | |
| 4c | do | | | | X | | | | | | | | X | | | X | X | | | | | |
| 5c | do | | | | | X | | | X | | | | | | | X | X | | | | | |
| 6c | do | | | | | | X | | X | | | | X | | | | | | | | | |
| 7c | do | | X | | | | | | | X | | | | | | | | | | X | | |
| 8c | do | | | | X | | | | X | | | | | | | | | | | | | X |
| 9c | X | | | | | | | | X | | | | | | | | | | | X | | |
| 10c | do | | X | | | | | | X | | | | | | | | | | | X | | |
| 11c | do | | | | X | | | | X | | | | | | | | | | | | | |
| 12c | do | | | | | X | | | | X | | | X | | | X | | | | | | |
| 13c | do | | X | | | | | | | | | X | | | | | X | | | | | |
| 14c | do | | | | X | | | | | | | | | | | | | | | X | | |
| 15c | do | | | X | | | | | | X | | X | | | | | | | | | | |
| 16c | do | | X | | | | | | | X | | | | | | X | | | | | | |
| 17c | do | X | | | | | | | | | | | X | | | | | | | X | | |
| 18c | 4b, 5b, and 6b | X | | | | | | | | X | | | | | | | X | | | | | |
| 19c | do | | X | | | | | | X | | | X | | | | | | X | | | | |
| 20c | do | | | X | | | | | | | | X | | | | X | X | | | | | |
| 21c | do | | | | | X | | | | | | X | | | | | X | | | | | |
| 22c | do | | | | | X | | | X | | | | | | | X | | | | | | |
| 23c | do | | | | | | X | | X | | | | | | | X | X | | | | | |
| 24c | do | | X | | | | | | | | | X | | | | | | | | X | | |
| 25c | do | | | | X | | | | X | | | | | | | | | | | | | X |
| 26c | do | X | | | | | | | X | | | | | | | | | | | | X | |
| 27c | do | | X | | | | | | X | | | | | | | | | | | X | | |
| 28c | do | | | X | | | | | X | | | | | | | X | | | | | | |
| 29c | do | | | | | X | | | X | | | | | | | | | | | | | |
| 30c | do | | X | | | | | | | | | X | | | | X | | | | | | |
| 31c | do | | | | X | | | | | | | | | | | | | | | X | | |
| 32c | do | | X | | | | | | X | X | | | | | | | | | | | | |
| 33c | do | | X | | | | | | | | | | | X | | | | | | | | |
| 34c | do | X | | | | | | | | | | | X | | | | | | | X | | |
| 35c | 7b, 8b, and 9b | X | | | | | | | | | | | | | | | | | | X | | |
| 36c | do | | X | | | | | | X | | | | | | | | X | | | | | |
| 37c | do | | | X | | | | | | X | | | | | | X | | | | | | |
| 38c | do | | | | X | | | | | | | | X | | | X | X | | | | | |
| 39c | do | | | | | X | | | X | X | | | | | | | X | | | | | |
| 40c | do | | | | | | X | X | X | | | | | | | | X | | | | | |
| 41c | do | | X | | | | | | | | | | X | | | | | | | X | | |
| 42c | do | | | | X | | | | X | | | | | | | | | | | | | X |
| 43c | do | X | | | | | | | X | | | | | | | | | | | | X | |
| 44c | do | | X | | | | | | X | | | | | | | | | | | X | | |
| 45c | do | | | | X | | | | X | | | | | | | | | | | | | |
| 46c | do | | | | | X | | | | X | | | | | | | X | | | | | |
| 47c | do | | X | | | | | | | | | X | | | | | X | | | | | |
| 48c | do | | | | X | | | | | | | X | | | | | | | X | | | |
| 49c | do | | | | X | | | | | X | | | | | | | | | X | | | |
| 50c | do | | X | | | | | | | | | X | | | | | | X | | | | |
| 51c | do | X | | | | | | | | | | | X | X | | | | | | | | |

Needless to say, comparable mixtures can be prepared on a solvent-free basis by using the undiluted components.

As has been stated elsewhere and specified in the claims these mixtures are synergistically better than the components of the mixture either alone or in binary mixture. This does not mean that such mixtures as defined in the claims were invariably and inevitably better than the components alone, or in combination, on all oils but I have found in numerous instances that such superiority is at least 10% or more, and sometimes 15% or more. In many instances the superiority is not only quantitative but also qualitative, i. e., not only will the mixture demulsify a larger quantity of oil than the components alone or in binary mixture but will also demulsify the oil faster or at a lower temperature, giving a pipeline oil having less foreign matter. See booklet entitled "Treating Oil Field Emulsions," used in the Vocational Training Courses, Petroleum Industry Series of the American Petroleum Institute.

PART 4

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels' to 2000 barrels' capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 20c, with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

Having thus described my invention, what I claim as new and desire to secure by Letters Patent is:

1. A process for breaking petroleum emulsions of the water-in-oil type characterized by subjecting the emulsion to the action of a demulsifier which in turn is a synergistic ternary mixture of three components, each of the three components being a hydrophile synthetic product; said hydrophile synthetic product being the oxyethylation product of (A) ethylene oxide, and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

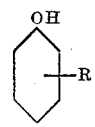

in which R is a hydrocarbon radical having at least 4 and not more than 18 carbon atoms and substituted in the 2,4,6 position; said oxyethylated resin being characterized by the introduction into the resin molecule of a plurality of divalent radicals having the formula $(C_2H_4O)_n$; in one of the three components $n$ varies from 2.0 to 2.4 on a molal basis calculated on the original phenolic hydroxy; in the second component $n$ varies from 3.0 to 3.6 on a molal basis calculated on the original phenolic hydroxyl; in the third component $n$ varies from 4 to 4.8 on a molal basis calculated on the original phenolic hydroxyl; the phenolic and aldehydic reactants being identical in all three components; the combining ratios of the three components being determined by the triangular area of the graph in the hereto appended drawing as defined approximately by the triangle A, B, C, said proportions being on a weight basis; and with the final proviso that said demulsifier be more effective than (1) any of the three components alone, or (2) any two of the three components in combination.

2. The process of claim 1 wherein the aldehyde is formaldehyde.

3. The process of claim 1 wherein the aldehyde is formaldehyde and the phenol is butylphenol.

4. The process of claim 1 wherein the aldehyde is formaldehyde and the phenol is amylphenol.

5. The process of claim 1 wherein the aldehyde is formaldehyde and the phenol is nonylphenol.

6. The process of claim 1 wherein the aldehyde is formaldehyde and the phenol is decylphenol.

7. The process of claim 1 wherein the aldehyde is formaldehyde and the phenol is tetradecylphenol.

MELVIN DE GROOTE.

REFERENCES CITED

The following references are of record in the file of this patent:

UNITED STATES PATENTS

| Number | Name | Date |
|---|---|---|
| 2,454,541 | Bock et al. | Nov. 23, 1948 |
| 2,499,365 | De Groote et al. | Mar. 7, 1950 |